United States Patent [19]

Komachi

[11] Patent Number: 5,394,318
[45] Date of Patent: Feb. 28, 1995

[54] DEVICE FOR ADJUSTING AND CONTROLLING THE OPTICAL AXIS OF A HEADLAMP

[75] Inventor: Hiroshi Komachi, Tokyo, Japan
[73] Assignee: Harada Kogyo Kabushiki Kaisha, Tokyo, Japan
[21] Appl. No.: 40,769
[22] Filed: Mar. 31, 1993
[51] Int. Cl.⁶ .............................................. B60Q 1/06
[52] U.S. Cl. .................... 362/420; 362/66; 362/273; 362/423; 362/289
[58] Field of Search .......... 362/420, 66, 68, 428, 362/71, 270, 273, 371, 423, 421, 418, 286, 289

[56] References Cited

U.S. PATENT DOCUMENTS

| | | | |
|---|---|---|---|
| 4,524,407 | 6/1985 | Igura | 362/66 |
| 4,574,334 | 3/1986 | Igura | 362/430 X |
| 4,916,587 | 4/1990 | Hirose et al. | 362/430 X |
| 5,251,114 | 10/1993 | Cantin et al. | 362/286 |

Primary Examiner—Larry Jones
Attorney, Agent, or Firm—Koda and Androlia

[57] ABSTRACT

A device for adjusting and controlling the optical axis of a headlamp including an optical axis initial setting mechanism which includes a manual operation section consisting of two operation bolts and a position adjustment member. The bolts provided with operation gears at one end are mounted to the casing of the device in a symmetrical positions on the left and right sides with the head portions of the operation bolts exposed to outside of the casing of the device. The position adjusting member has a gear portion at one end that engages with respective operation gears of the operation bolts and also has an engagement portion at the other end that engages with the aiming shaft so that the engagement portion, which is used for adjustment and control of the optical axis of the headlamp, can slide in the axial direction but cannot rotate in the circumferential direction of the aiming shaft.

3 Claims, 2 Drawing Sheets

DEVICE FOR ADJUSTING AND CONTROLLING THE OPTICAL AXIS OF A HEADLAMP

DETAILED DESCRIPTION OF THE INVENTION

1. Field of the Invention

The present invention relates to a device for adjusting and controlling the optical axis of a headlamp which is used for adjusting and controlling the angle of the optical axis of the lights of headlamps such as automobile headlamps, etc. and more particularly to an improvement in the means for initially setting the angle of the optical axis of a headlamp.

Prior Art

Generally, devices of this type for adjusting and controlling the optical axis of a headlamp include two optical axis adjustment and control devices. The two devices are installed in symmetrical positions on the left and right sides of the vehicle so as to correspond to the headlamps of the left and right sides of the vehicle. In such cases, the device installed on the left side of the vehicle has a "left-side mechanism for initial setting of the angle of the optical axis", and the device installed on the right side of the vehicle has a "right-side mechanism for initial setting of the angle of the optical axis".

These conventional devices involve some problems. A device which is to be installed on the left side of the vehicle and a device which is installed on the right side of the vehicle include their own peculiar "mechanisms for initial setting of the angle of the optical axis", and these left-side and right-side devices differ from each other in structure. Accordingly, a pair of these devices, which are a left-side device and a right-side device, need to be prepared. If these devices are not appropriately selected, there will be trouble when they are installed in the vehicle. As a result, manufacture, storage and installation of the devices tend to be complicated, and the manufacturing costs, storage costs and installation costs, etc. are increased. In addition, the initial angle setting mechanisms are usually in packaged units, and such units are relatively large in size; thus, the use of such unit-packaged initial setting mechanism is also the reason for the increase of the cost of manufacturing.

SUMMARY OF THE INVENTION

Accordingly, the object of the present invention is to provide a small, light-weight and economical device for adjusting and controlling the optical axis of a headlamp, in which manufacture, storage, installation, etc. of the device do not require any distinction between the left-side devices and the right-side devices, so that manufacturing costs, storage costs, installation costs, etc. can be low, and the overall size of the device can be compact.

In the present invention, the following means are adopted in order to solve the problems of prior art and accomplish the object of the invention:

In particular, the device of the present invention is characterized by the fact that the device includes: a motor which makes forward and reverse rotations; an aiming shaft which can reciprocate or can advance and retract in the axial direction by the rotational force of the motor which is transmitted via a driving gear so that the aiming shaft controls at the end the angle of the optical axis of a headlamp; and an optical axis initial setting mechanism which initially sets the angle of the optical axis of the headlamp by rotating the aiming shaft about its own axis, and the optical axis initial setting mechanism includes a manual operating section which is comprised of: a pair of operation bolts which are provided with operation gears at their respective ends and are symmetrically mounted to a casing of the device on the left and right sides with the heads of the bolts exposed outside of the casing so that the bolts are operated manually from the outside of the casing; and a position-adjustment member which has a gear portion at one end that engages with the operation gears of the two operation bolts, the position-adjustment member also having an engagement portion at the other end that engages with the aiming shaft so that the engagement portion slides in the axial direction but does not rotate in the circumferential direction relative to the aiming shaft.

It is desirable that the optical axis initial setting mechanism be such that the angle of the optical axis of the headlamp is initially set when the aiming shaft is rotated via the manual operating section so that the linkage position of the aiming shaft and the headlamp is changed.

It can also be designed so that the angle of the optical axis of the headlamp is initially set by rotating the aiming shaft via the manual operating section so that a screw-coupling between the driving gear and a screw part or a thread formed on the aiming shaft is adjusted via a feed-screw manner.

As a result of the means described above, the effect as noted below is obtained. In particular, since the operation bolts are mounted to the casing of the device symmetrically left and right, there is absolutely no need to make any distinction between left-side device and right-side device in the process of manufacture, storage, installation, etc. Accordingly, manufacturing costs, storage costs, installation costs, etc. can be low. In addition, since the optical axis initial setting mechanism is integrally built inside the casing of the device and is not a separate packaged unit, the device can be compact as a whole. Accordingly, a small, light-weight and economical optical axis adjustment and control device for a headlamp is obtained.

DETAILED DESCRIPTION OF THE INVENTION

Figure 1A:
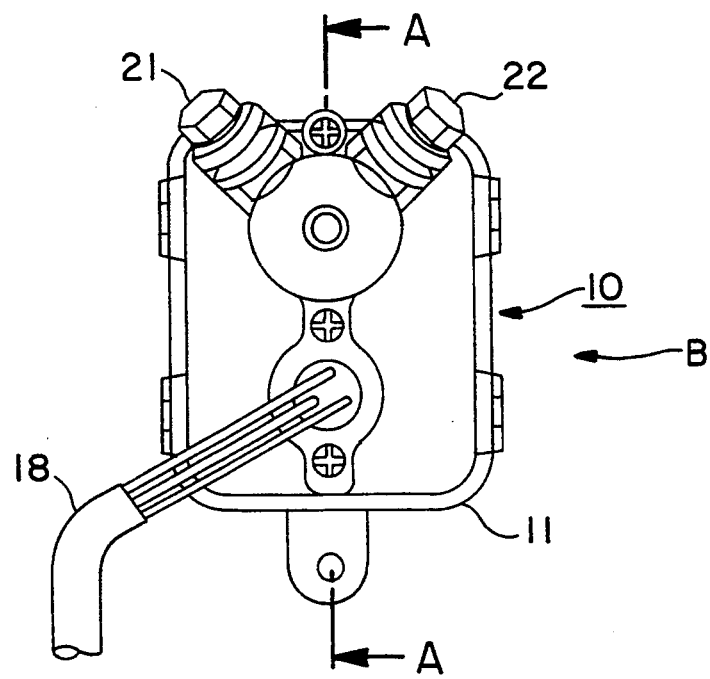
FIGS. 1(a) and 1(b) illustrate a front view and a side view of the external appearance of an optical axis adjustment and control device for a headlamp according to one embodiment of the present invention.
Figure 1B:
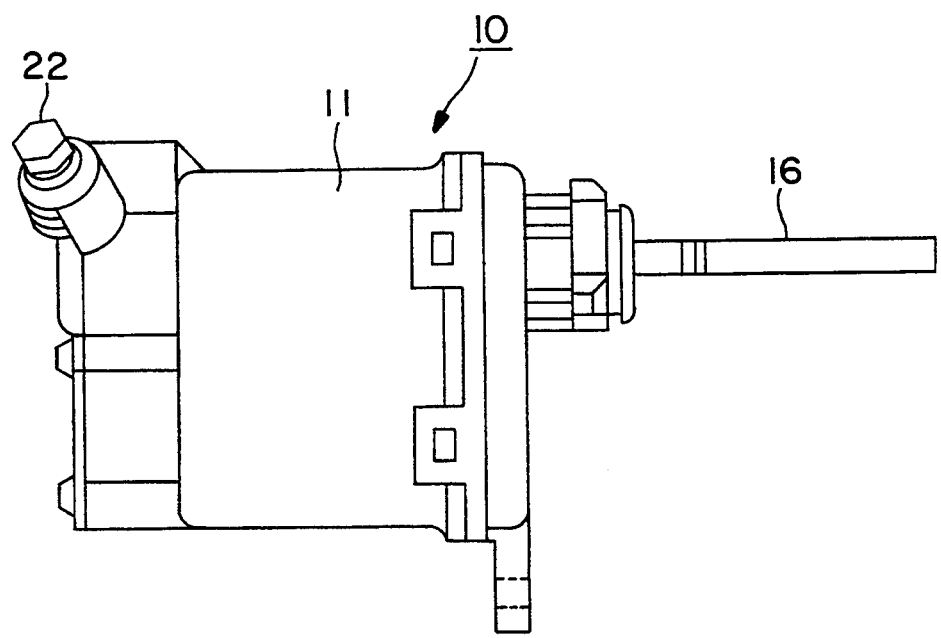
Figure 2A:
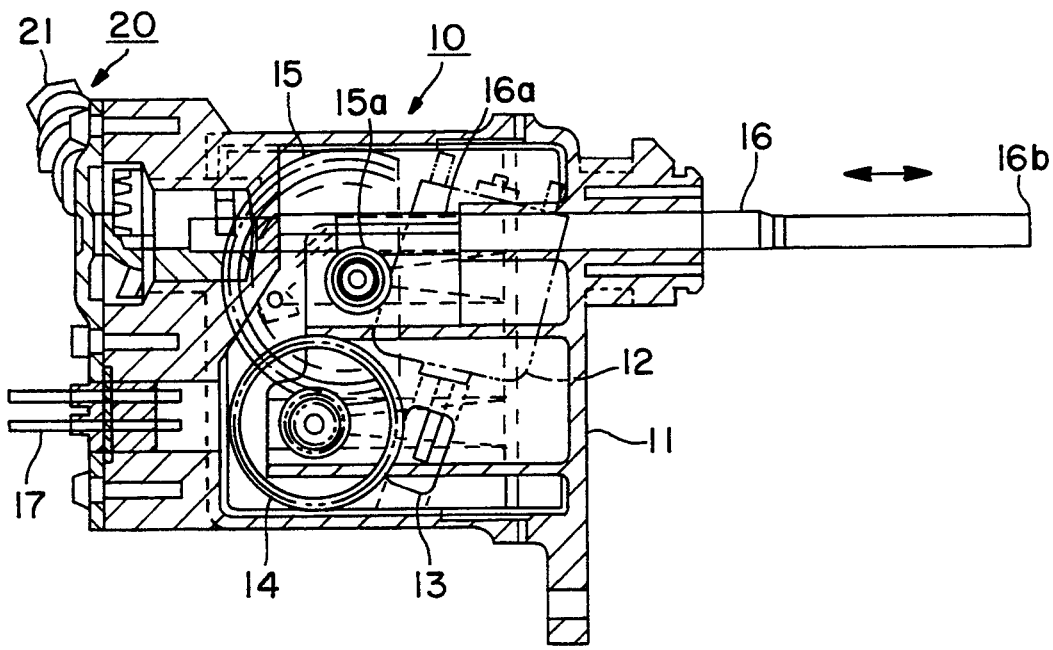
FIGS. 2(a) and 2(b) illustrate cross sections of the structure of the optical axis adjustment and control device for a headlamp of the embodiment.
Figure 2B:
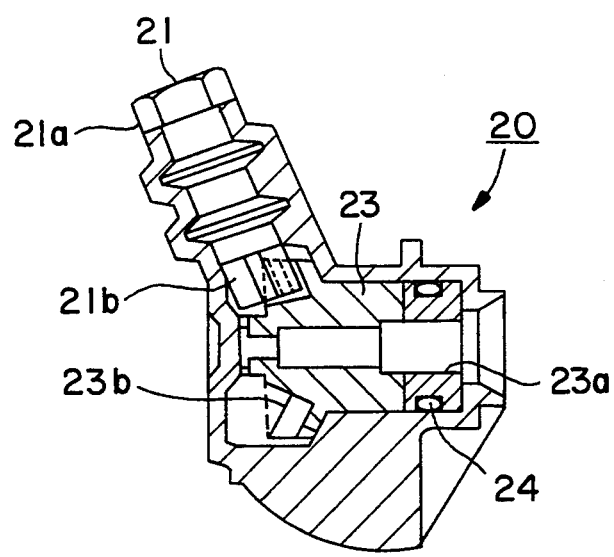

FIGS. 1(a) and 1(b) show external views of a headlamp optical axis adjustment and control device 10 according to one embodiment of the present invention. FIG. 1(a) is the front view, and FIG. 1(b) is the side view taken from the direction of arrow B in FIG. 1(a) with some portions of the device omitted. FIGS. 2(a) and 2(b) are cross sections of the headlamp optical axis adjustment and control device 10 of the same embodiment. FIG. 2(a) is a cross section taken along the line A—A in FIG. 1(a), and FIG. 2(b) is an enlarged cross section of manual operating section of the optical axis initial setting mechanism.

As shown in FIGS. 1 and 2, a motor 12 which is controlled so as to rotate in the forward and reverse directions is installed inside the casing 11 of the optical axis adjustment and control device 10. The rotational force of the motor 12 is transmitted from a worm gear 13, which is attached to the output shaft of the motor 12, to an aiming shaft 16 via two two-stage speed reduction gears 14 and 15. A ring-form rack 16a is formed on the circumferential surface of the aiming shaft 16. The ring-form rack 16a engages with the pinion 15a of the gear 15, which is a driving gear. Thus, the aiming shaft 16 is caused to advance and retract in the axial direction as indicated by arrows in FIG. 2(a) via the rotational force of the motor 12 which is transmitted via the pinion 15a and the rack 16a. As a result, the aiming shaft 16 can variably control the optical axis of a headlamp (not shown) that is linked to the end position 16b of the aiming shaft 16. Reference numeral 17 is a power input which supplies power to the motor 12.

The aiming shaft 16 is connected to an optical axis initial setting mechanism which is used for initially setting the angle of the optical axis of the headlamp. With this optical axis initial setting mechanism, the angle of the optical axis of the headlamp is set initially when the aiming shaft 16 is rotated about its axis.

More specifically, the optical axis initial setting mechanism of this embodiment is installed so that the angle of the optical axis of the headlamp is set initially when the aiming shaft 16 is rotated via a manual operating section 20, which is described below, so that the linkage position of the aiming shaft 16 and the headlamp is adjustably changed.

The manual operating section 20 of the optical axis initial setting mechanism is provided at the base end of the aiming shaft 16, and it is comprised of a pair of operation bolts 21 and 22 and a position-adjustment member 23. As shown in FIG. 1(a), the operation bolts 21 and 22 are mounted to the casing 11 so as to be symmetrical on the left and right. The head portions 21a and 22a provided at one end of each one of the operation bolts 21 and 22 (only the head portion 21a is shown in FIG. 2(b) with the head portion 22a omitted) are exposed outside of the casing 11. Thus, the operation bolts 21 and 22 are manually operated from the outside of the casing 11.

Furthermore, at the other end of each one of the operation bolts 21 and 22 is provided with operation gears 21b and 22b (only the operation gear 21b is shown in FIG. 2(b) with the gear 22b omitted). These operating gears 21b and 22b are in a shape of, for example, a plus driver.

On the other hand, the position-adjustment member 23 of the manual operating section 20 is provided at one end with a gear portion 23b, which is a bevel gear shape, and at the other end with an engagement portion 23a. The gear portion 23b engages in common with the operation gears 21b and 22b of the operation bolts 21 and 22. The engagement portion 23a engages with the aiming shaft 16 in such a manner that the engagement portion 23a can slide in the axial direction of the aiming shaft 16 but cannot rotate in the circumferential direction of the aiming shaft 16. The reference numeral 24 is an O-ring.

The optical axis initial setting operation and the optical axis controlling operation of the adjustment and control device 10 will be described below. Two of the identically constructed devices 10 are installed on the left and right sides of a vehicle. Accordingly, the optical axis initial setting operation and the optical axis control operation which will be described below are performed in exactly the same manner in the left and right-side devices 10.

The initial setting of the optical axis of the headlamp is performed so that one of the two operation bolts 21 and 22, whichever is easier to operate, is first selected, and the head portion of the selected bolt, for example the operation bolt 21, is rotated manually from the outside of the casing 11 (in this case, the other operation bolt 22 may be rotated also at the same time in order to assist the adjustment operation). As a result, the position-adjustment member 23 is rotated since the gear portion 23b of the position-adjustment member 23 is engaged with the operation gear 21b of the selected operation bolt 21. When the position-adjustment member 23 is thus rotated, the aiming shaft 16 is rotated about its own axis and advances or retracts. As a result, the linkage position of the end portion 16b of the aiming shaft 16 and the headlamp (not shown) is changed. The initial setting of the angle of the optical axis of the headlamp is thus accomplished.

Next, the operation of the device 10 to control the optical axis during ordinary (and not at the initial) use will be described. When a power is supplied via the power input 17, the motor 12 is rotated in the forward or reverse direction. This rotational force of the motor 12 is transmitted from the worm gear 13 of the motor 12 to the aiming shaft 16 via the two-stage speed reduction gears 14 and 15, the pinion 15a, and the rack 16a of the aiming shaft 16. As a result, the aiming shaft 16 is advanced or retracted a specific amount in the axial direction (as shown by the arrows) in accordance with the amount of rotation of the pinion 15a. Thus, the optical axis of the headlamp is controlled at the end portion 16b of the aiming shaft 16.

As described above, since two operation bolts 21 and 22 are mounted in symmetrical positions on the left and right sides of the casing 11, there is absolutely no need to make any distinction between the left-side device and the right-side device during the manufacture, storage, installation, etc., which is required in the conventional devices. Thus, the manufacturing costs, storage costs, installation costs, etc. can be low. Furthermore, since the manual operating section 20 of the optical axis initial setting mechanism can be built integrally in the casing 11 without being packaged as a separate unit, the overall size of the device 10 can be compact. Accordingly, a small, light-weight and economical device for adjusting and controlling the optical axis of a headlamp is obtainable.

The present invention is not limited to the embodiment described above. For example, the mechanism used in the embodiment described above is designed so that the angle of the optical axis of the headlamp is set initially by rotating the aiming shaft 16 via the manual operating section 20, thus adjusting the coupling position between the aiming shaft 16 and the headlamp. However, it is also possible to utilize a screw part or a thread (of a feed screw structure) which is formed on the circumferential surface of the aiming shaft 16 (instead of the rack 16a) and a gear which is a driving gear engaged with the screw part or the thread of the aiming shaft 16. In this case, the angle of the optical axis of the headlamp can be set initially when the aiming shaft 16 is rotated via the manual operating section 20 in such a manner that the screw-coupling between the screw part or the thread and the driving gear is adjusted in a feed screw fashion. Furthermore, it goes without saying that various other modifications are available without departing from the spirit of the present invention.

According to the present invention, since the operation bolts are mounted on the casing of the device in symmetrical positions on the left and right, there is absolutely no need to make any distinction between the left-side device and the right-side device during manufacture, storage, installation, etc. which is the case in conventional devices. Thus, the manufacturing costs, storage costs, installation costs, etc. can be low. In addition, since the manual operating section of the optical axis initial setting mechanism can be integrally built in the casing of the device without making it packaged as a separate unit, the device can be compact as a whole. As a result, a small, light-weight and economical device for adjusting and controlling the optical axis of a headlamp can be obtained.

I claim:

1. A device for adjusting and controlling an optical axis of a headlamp, said device comprising:
   a casing for said device;
   a motor controlled so as to rotate in forward and reverse directions;
   an aiming shaft which advances and retracts in an axial direction of said aiming shaft by rotational force of said motor which is transmitted via a driving gear to control an optical axis of a headlamp at an end of said aiming shaft; and
   an optical axis initial setting mechanism which initially sets an angle of said optical axis of said headlamp by rotating said aiming shaft about its own axis; and
   wherein said initial setting mechanism includes a manual operating section which consists of:
   a pair of operation bolts which are symmetrically mounted to said casing of said device on both left and right sides, each bolt having at one end a head portion which is exposed to outside of said casing so that said bolts are operated manually from the outside of said casing;
   an operation gear provided on an other end of each of said pair of operation bolts; and
   a position-adjustment member comprising a gear portion at one end which engages with respective ones of said operation gears of said operation bolts and an engagement portion at another end which engages with said aiming shaft so that said engagement portion can slide in an axial direction of said aiming shaft but cannot rotate in a circumferential direction of said aiming shaft.

2. A device for adjusting and controlling an optical axis of a headlamp according to claim 1 wherein said optical axis initial setting mechanism is designed so that an angle of an optical axis of said headlamp is set initially by rotating said aiming shaft via said manual operating section so that a position of said aiming shaft and said headlamp is adjusted to change.

3. A device for adjusting and controlling an optical axis of a headlamp according to claim 1 wherein said optical axis initial setting mechanism is designed so that an angle of an optical axis of said headlamp is set initially by rotating said aiming shaft via said manual operating section so that a screw-coupling relationship between said driving gear and a screw part formed on circumferential surface of said aiming shaft is adjusted to change in a feed-screw fashion.

* * * * *